(12) United States Patent
Kang et al.

(10) Patent No.: US 8,179,511 B2
(45) Date of Patent: May 15, 2012

(54) LIQUID CRYSTAL PANEL FOR IMPROVING THE UNIFORMITY OF THE PARASITIC CAPACITOR AND FABRICATION METHOD THEREOF

(75) Inventors: Moon Soo Kang, Daegoo-Si (KR); Hyung Ho Ahn, Gyeonggi-Do (KR)

(73) Assignee: LG Display Co., Ltd. (KR)

( * ) Notice: Subject to any disclaimer, the term of this patent is extended or adjusted under 35 U.S.C. 154(b) by 1385 days.

(21) Appl. No.: 11/451,374

(22) Filed: Jun. 13, 2006

(65) Prior Publication Data

US 2007/0103609 A1    May 10, 2007

(30) Foreign Application Priority Data

Nov. 10, 2005   (KR) .................. 10-2005-0107315

(51) Int. Cl.
*G02F 1/136* (2006.01)
*G02F 1/1343* (2006.01)
(52) U.S. Cl. ............... 349/141; 349/41; 349/42; 349/43
(58) Field of Classification Search .................. 349/141, 349/39–43
See application file for complete search history.

(56) References Cited

U.S. PATENT DOCUMENTS

| | | | |
|---|---|---|---|
| 5,032,536 A * | 7/1991 | Oritsuki et al. ................ 438/30 |
| 2003/0117560 A1 * | 6/2003 | Yang et al. .................... 349/141 |
| 2005/0041169 A1 * | 2/2005 | Hashimoto et al. ............. 349/43 |
| 2005/0078259 A1 * | 4/2005 | Ahn et al. ..................... 349/141 |
| 2006/0061700 A1 * | 3/2006 | Chung et al. .................... 349/38 |

* cited by examiner

*Primary Examiner* — Lauren Nguyen
(74) *Attorney, Agent, or Firm* — Birch, Stewart, Kolasch & Birch, LLP

(57) ABSTRACT

A liquid crystal panel and a fabrication method thereof are provided. The liquid crystal panel includes: a gate line and a data line crossing each other to define a pixel; a thin film transistor including: a gate electrode connected to the gate line; a semiconductor layer formed on the gate electrode; a source electrode connected to the data line; a drain electrode; a gate insulating layer between the gate electrode and the drain electrode and between the gate line and the drain electrode; and a compensating parasitic capacitor between the gate line and the drain electrode for compensating a parasitic capacitance between the gate electrode and the drain electrode; and a pixel electrode connected to the drain electrode.

21 Claims, 7 Drawing Sheets

LIQUID CRYSTAL PANEL FOR IMPROVING THE UNIFORMITY OF THE PARASITIC CAPACITOR AND FABRICATION METHOD THEREOF

This Nonprovisional Application claims priority under 35 U.S.C. §119(a) on Patent Application No. 10-2005-0107315 filed in Korea on Nov. 10, 2005, the entire contents of which are hereby incorporated by reference.

BACKGROUND OF THE INVENTION

1. Field of the Invention

The present invention relates to a liquid crystal panel and a fabrication method thereof, and more particularly, to a liquid crystal panel and a fabrication method thereof for preventing an image quality of a liquid crystal panel from being degraded by suppressing an afterimage and a flicker.

2. Description of the Related Art

FIG. 1 is a plan view of an In-Plane switching mode liquid crystal panel according to the related art, and FIG. 2 is a cross-sectional view taken along line I-I' of FIG. 1.

Referring to FIGS. 1 and 2, a liquid crystal panel includes a thin film transistor 28 disposed at a crossing of a gate line 12 and a data line 22, a plurality of pixel electrodes 33 connected to a drain electrode 25 of the TFT electrode, and a common electrode 17 crossly formed to be separated from the pixel electrode 33 at a predetermined distance. A storage capacitor Cst 27 is formed at a region where the common line 15 and the drain electrode 25 are overlapped.

The TFT 28 includes a gate electrode 13 connected to the gate line 12, a source electrode 23 connected to the data line 22, a drain electrode 25 connected to the pixel electrode 33 through a contact hole 31 and a semiconductor layer 21 for forming a channel between the source electrode 23 and the drain electrode 25 by a gate voltage supplied from the gate electrode 13. The semiconductor layer 21 is formed by sequentially stacking an active layer 21a and an ohmic contact layer 21b.

The TFT 28 further includes a gate insulating layer 19 for insulating the gate electrode 13 from the source and drain electrode 23 and 25. The TFT 28 transfers a data signal from the data line 22 to the pixel electrode 33 in response to a gate signal from the gate line 12.

The pixel electrode 33 is arranged on a cell region defined by the data line 22 and the gate line 12 and is made of a transparent conductive material such as indium tin oxide (ITO). The pixel electrode 33 is formed on a passivation layer 29 that is formed on the entire surface of the board 11, and is electrically connected to the drain electrode 25 through the contact hole 31 penetrating through the passivation layer 29.

In the cell region, a common electrode 17 is parallel and interlaced with the pixel electrode at a predetermined interval. The common electrode 17 may be formed of a material identical to the gate electrode 13 or to the pixel electrode 33.

The storage capacitor Cst 27 is provided at a region where the common line 15 and the drain electrode 25 are overlapped with the gate insulating layer 19 interposed therebetween.

A parasitic capacitor Cgd 26 is provided at a region where the gate electrode 13 and the drain electrode 25 are overlapped with a gate insulating layer 19 interposed therebetween. Although it is not shown in the accompanying drawings, a parasitic capacitor Cgs is provided at a region where the gate electrode 13 and the source electrode 23 are overlapped, and another parasitic capacitor Cds is provided between the source electrode 23 and the drain electrode 25.

Herein, the capacitance of the parasitic capacities Cgs and Cds are very small compared to the capacitance of the parasitic capacitor Cgd 26.

Herein, a region A in FIG. 1 is a design margin region of the parasitic capacitor Cgd 26 for twisting of a top and bottom overlay because the design margin region depends on a width and a length of a channel.

FIG. 3 shows an equivalent circuit diagram of a pixel unit of the liquid crystal panel of FIG. 1. As shown in FIG. 1, the gate electrode 13, the source electrode 23 and the drain electrode 25 of the TFT 28 are connected to the gate line 12, the data line 22 and the pixel electrode 33, respectively. In FIG. 3, a liquid crystal capacitor Clc is generated by a liquid crystal material filled between the pixel electrode 33 and the common electrode 17. The storage capacitor Cst 27 is formed at a region where the gate electrode 13 and the drain electrode 25 are overlapped. The parasitic capacitor Cgd 26 is provided at a region where the gate electrode 13 and the drain electrode 25 are overlapped with the gate insulating layer 19 interposed therebetween. In addition, the parasitic capacitor Cgs is provided at a region where the gate electrode 13 and the source electrode 23 are overlapped with the gate insulating layer 19 interposed therebetween. Furthermore, another parasitic capacitor Cds is provided at a region where the source electrode 23 and the drain electrode 25 are overlapped with the gate insulating layer 19 interposed therebetween.

Hereinafter, the operations of the liquid crystal panel according to the related art will be described.

At first, a gate-on voltage is supplied to the gate electrode 13 connected to a target gate line 12 turns on the TFT 28, and a data voltage Vd+, i.e., the data signal, is supplied to the drain electrode 25 by supplying the data voltage Vd+ to the source electrode 23. Then, the data voltage Vd+ is supplied to the liquid crystal capacitor Clc and the storage capacitor Cst 27 through the pixel electrode 33. As a result, an electric field is generated by a potential difference between the pixel electrode 33 and the common electrode 17. Since the liquid crystal is deteriorated if an electric field with same directivity is continuously supplied to the liquid crystal, the data signal is supplied with the polarity thereof repeatedly changing from a plus polarity (+) to a minus polarity (−) or vice versa against a common voltage Vcom.

The voltage, which is supplied to the liquid crystal capacitor Clc and the storage capacitor Cst 27 when the TFT 28 is turned on, must be maintained constantly even when the TFT 28 is turned off. However, the voltage supplied to the pixel electrode 33 is distorted due to the parasitic capacitor Cgd 36 between the gate electrode 13 and the drain electrode 25. Such a distorted voltage is called a kick-back voltage. The kick-back voltage is expressed as the following Eq. 1.

$$\Delta V_p = \frac{C_{gd}}{C_{gd} + C_{st} + C_{lc}} \Delta V_g \qquad \text{Eq. 1}$$

In Eq. 1, Cgd denotes a parasitic capacitor between the gate electrode and the drain electrode, Cst denotes a sub capacitor, Clc denotes a liquid crystal capacitor and ΔVg denotes a variation of the gate voltage (Vgon-Voff).

Such a voltage distortion always pulls down the voltage of the pixel electrode 33 regardless of the polarity of the data voltage as shown in FIG. 4.

In an ideal liquid crystal panel, the data voltage is constantly maintained even when the gate voltage Vg becomes OFF as shown in a dotted line of FIG. 4. However, in a real liquid crystal panel, the pixel voltage Vp is reduced by the amount of the kick-back voltage ΔVp, as shown in a solid line of FIG. 4, due to the kick-back voltage ΔVp when the gate voltage Vg transits from a high state to a low state.

In order to improve the image quality by reducing the afterimages or flickers, the kickback voltage ΔVp must be identical throughout all cells in the panel or among frames.

To keep kickback voltage ΔVp identical throughout all cells, the parasitic capacitor Cgd at each cell has to uniform in order to constantly maintain the kick-back voltage ΔVp in all cells.

However, it is very difficult to optimize a design of a liquid crystal panel to uniformly maintain the parasitic capacitor Cgd 26 at each cell. If the drain electrode 25 is slightly shifted in the up or down direction due to misalignment at the small design margin region A, it will increase a deviation of the parasitic capacitor Cgd 26. Such a changing of the deviation makes the kick-back voltage ΔVp varied.

Since it is difficult to control the kick-back voltage ΔVp, when the parasitic capacitor Cgd 26 cannot be uniformly maintained throughout the entire liquid crystal panel, the image quality of the liquid crystal panel is degraded due to the afterimages and the flickers which are caused by the deviation of the kick-back voltage.

SUMMARY OF THE INVENTION

Accordingly, the present invention is directed to a liquid crystal panel and a fabrication method thereof that substantially obviates one or more problems due to limitations and disadvantages of the related art.

An object of the present invention is to provide a liquid crystal panel and a fabrication method thereof for improving a uniformity of a parasitic capacitor by providing a compensating parasitic capacitor.

Another object of the present invention is to provide a liquid crystal panel for preventing an image quality from being degraded and securing reliability through suppressing afterimages and flickers by improving the uniformity of the parasitic capacitor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal panel comprises: a gate line and a data line crossing each other to define a pixel; a thin film transistor including: a gate electrode connected to the gate line; a semiconductor layer formed on the gate electrode; a source electrode connected to the data line; a drain electrode; a gate insulating layer between the gate electrode and the drain electrode and between the gate line and the drain electrode; and a compensating parasitic capacitor between the gate line and the drain electrode for compensating a parasitic capacitance between the gate electrode and the drain electrode; and a pixel electrode connected to the drain electrode.

In another aspect of the present invention, a method of fabricating a liquid crystal panel comprises: forming a gate line and a data line crossing each other to define a pixel; forming a thin film transistor including: forming a gate electrode connected to the gate line; forming a semiconductor layer formed on the gate electrode; forming a source electrode connected to the data line; forming a drain electrode to provide a compensating parasitic capacitor between the gate line and the drain electrode to compensate a parasitic capacitance between the gate electrode and the drain electrode; and forming a gate insulating layer between the gate electrode and the drain electrode and between the gate line and the drain electrode; and forming a pixel electrode connected to the drain electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
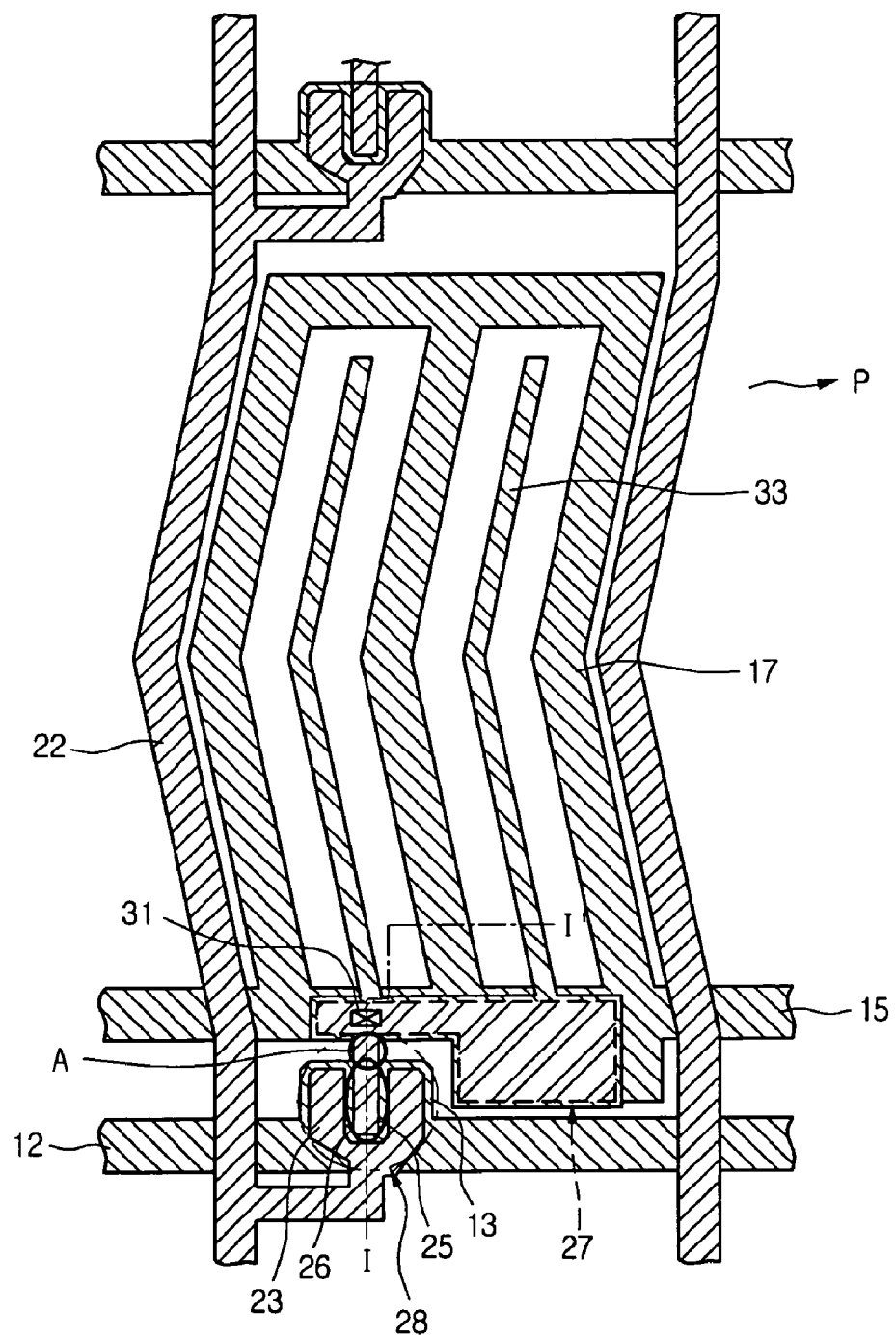
FIG. 1 is a plan view of an In-plane switching mode liquid crystal panel according to the related art.
Figure 2:
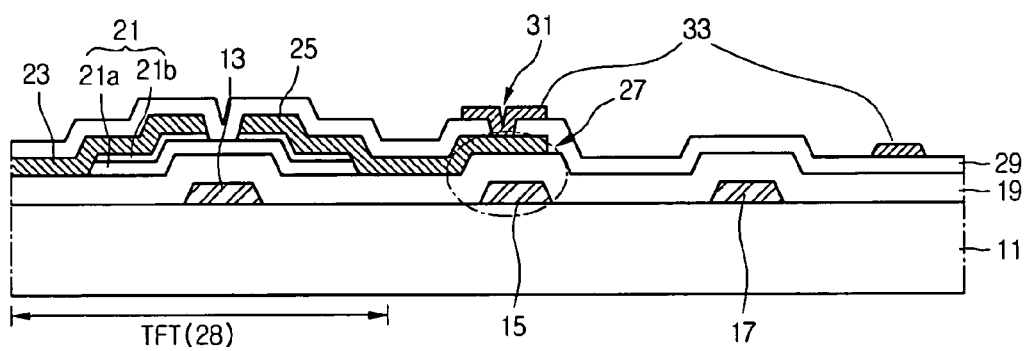
FIG. 2 is a cross-sectional view taken along line I-I' of FIG. 1.
Figure 3:
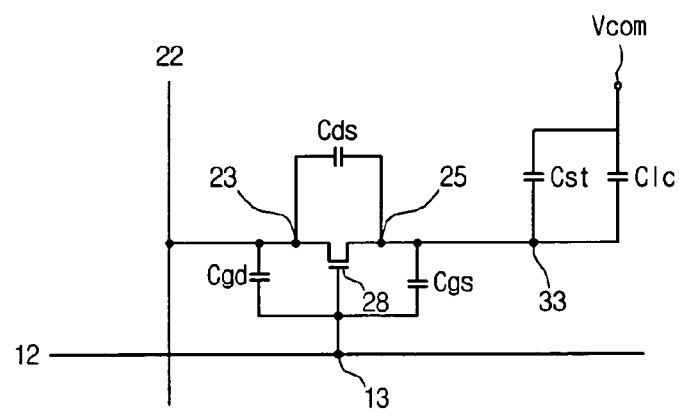
FIG. 3 is an equivalent circuit diagram of a pixel unit of the liquid crystal panel of FIG. 1.
Figure 4:
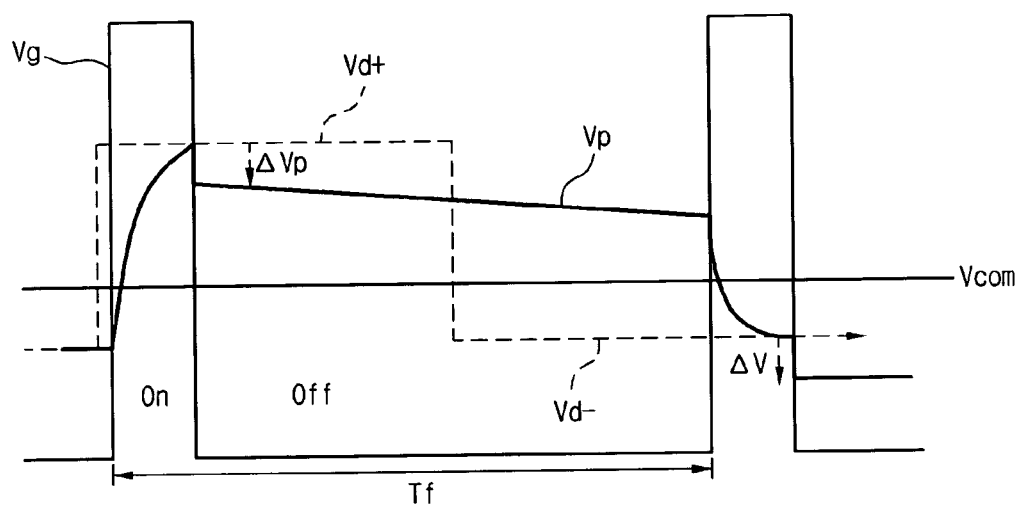
FIG. 4 is a graph showing a voltage distortion caused by a kick-back voltage.
Figure 5:
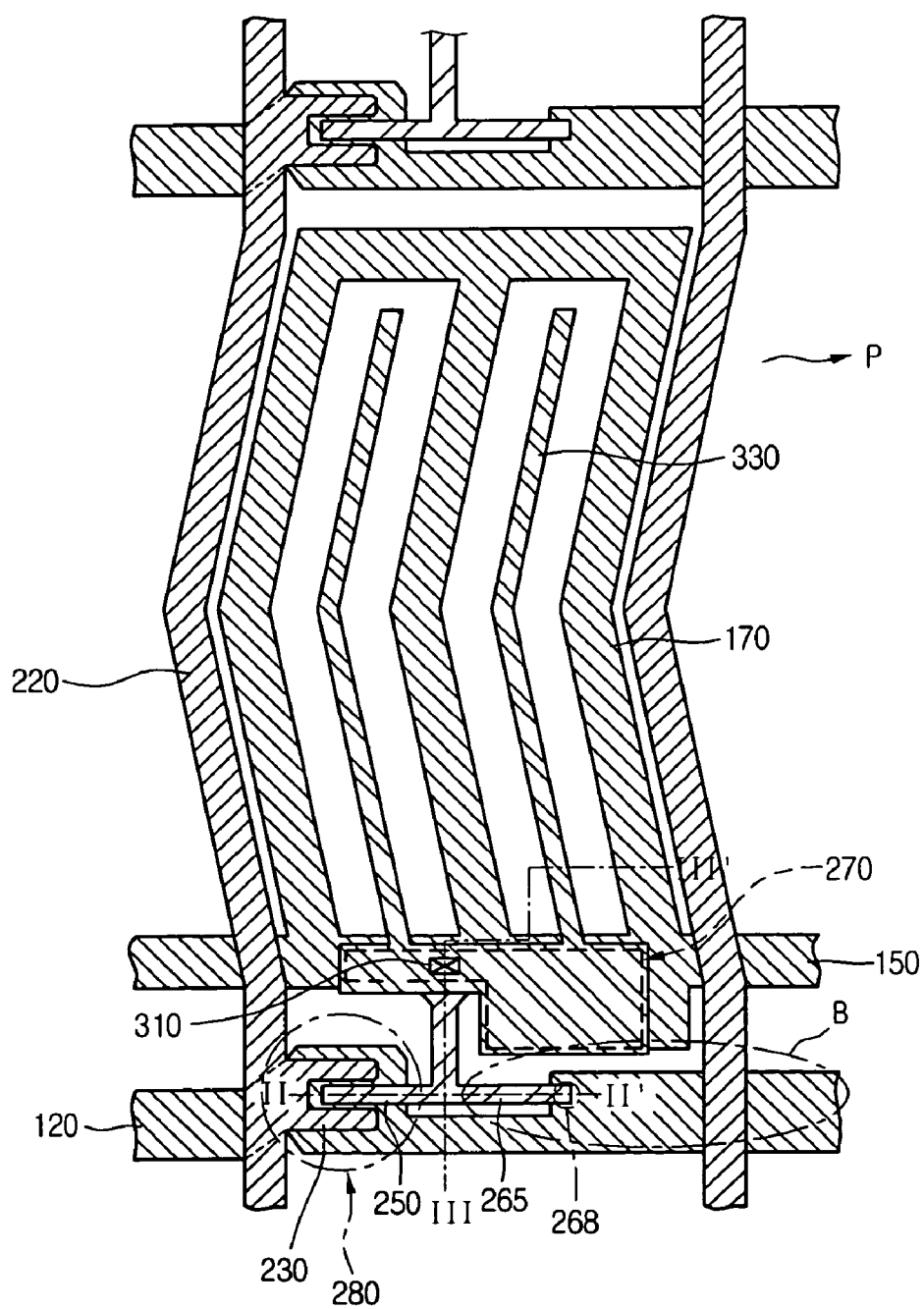
FIG. 5 is a plan view of an In-plane switching mode liquid crystal panel according to an embodiment of the present invention.

FIG. 5 is a plan view of an In-plane switching mode liquid crystal panel according to an embodiment of the present invention. Referring to FIG. 5, a plurality of gate lines 120 is arranged on a board of a liquid crystal panel in a first direction, i.e., a horizontal direction. A plurality of data lines 220 are arranged perpendicularly from the gate lines 120, i.e., in a second direction.

A pixel region P is defined by the gate line 120 and the data line 220. In the pixel region P, a thin film transistor (TFT) 280 is disposed at a crossing of the gate line 120 and the data line 220, and a pixel electrode 330 is electrically connected to a drain electrode 250 of the TFT 280 through a contact hole 310. The pixel electrode 330 may be made of a transparent conductive material such as indium tin oxide (ITO) or indium zinc oxide (IZO).

A common line 150 is formed parallel with the gate line 120, and a storage capacitor Cst 270 is formed between the common line 150 and the drain electrode 250 with an insulating layer 190 interposed therebetween.

The TFT 280 includes a gate electrode 130 connected to the gate line 120, a U-shaped source electrode 230 connected to the data line 220 and a drain electrode 250 separated from the source electrode 230. The drain electrode 250 has at least two protrusions connected to the pixel electrode 330.

Figure 6A:
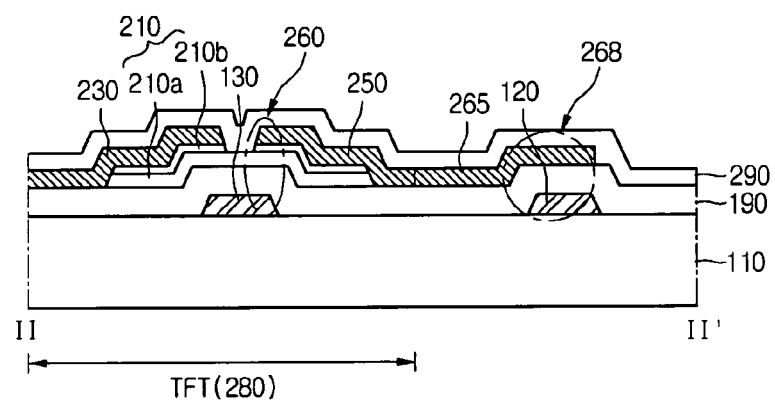
FIGS. 6A and 6B are cross-sectional views taken along lines II-II' and III-III' of FIG. 5.
Figure 6B:
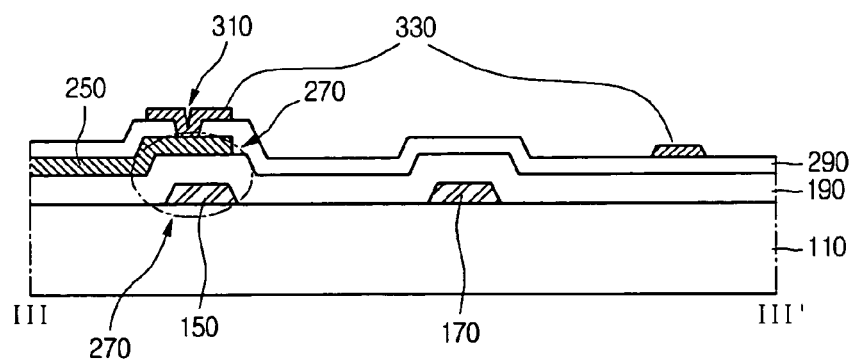

One of the protrusions of the drain electrode 250 overlaps with the gate electrode 130 (see FIG. 6A), and the other protrusion is connected to the pixel electrode 330 and overlaps with the common line 150 (see FIG. 6B.)

Herein, a U-shaped channel region is formed between the U-shaped source electrode 230 and the drain electrode 250, and a semiconductor layer (not shown) having an active layer with a predetermined region is exposed between the U-shaped source electrode 230 and the drain electrode 250.

In the TFT 280 region, a parasitic capacitor C'gd 260 is provided at a region where the gate electrode 130 and the drain electrode 250 are overlapped with an insulating layer interposed therebetween. Herein, a compensating drain electrode 265 is integrally formed with and connected to the daring electrode 250 and overlaps with the gate line 120. A compensating parasitic capacitor C"gd 268 is formed at a region where the compensating drain electrode 265 and the gate line are overlapped with an insulating layer interposed therebetween. The compensating drain electrode 265 is made of a material identical to the drain electrode 250 and formed at a same layer of the drain electrode 250. That is, the compensating drain electrode 265 is simultaneously formed with the drain electrode 250. Also, the drain electrode 250 and the compensating drain electrode 265 are disposed parallel with the gate line 120. The drain electrode 250 and the compensating drain electrode 265 are not overlapped with the gate line 120 and the edge portions of the drain electrode 250 and the compensating drain electrode 265 are just overlapped with each of the gate electrode 130 and the gate line 120. Accordingly, The width of the gate line 120 of the region which are not overlapped with the drain electrode 250 and the compensating drain electrode 265 is more narrow than the width of other gate line.

In fact, the combination of the compensating drain electrode 265 and the drain electrode 250 in the illustrated embodiment can be considered as a drain electrode with three ends. The first end of the drain electrode overlaps with the gate electrode 130 to provide the parasitic capacitor C'gd 260. The second end of the drain electrode overlaps with the gate line 120 to provide the compensating parasitic capacitor C"gd 268. The third end of the drain electrode overlaps with the common line 150 to form the storage capacitor Cst 270, and is connected to the pixel electrode 330.

The parasitic capacitor C'gd 260 and the compensating parasitic capacitor C"gd 268 are connected in parallel because the gate electrode 130 is in contact with the gate line 120. Therefore, a total parasitic capacitance of the parasitic capacitor Cgd is the total capacitance of the parasitic capacitor C'gd 260 and the compensating parasitic capacitor C"gd 268.

As described above, the illustrated liquid panel additionally includes the compensating parasitic capacitor C"gd 268 formed between the compensating drain electrode 265 and the gate line 120 with the gate insulating layer serving as the insulating layer of the compensating parasitic capacitor C"gd 268 by forming the compensating drain electrode 265 integrally with the drain electrode 250 between the gate line 120 and the drain electrode 250.

The compensating drain electrode 265 in a design margin region B provides the compensating parasitic capacitor C"gd 268 to compensate the capacitance of the parasitic capacitor C'gd 260 when the combination of the drain electrode 250 and the compensating drain electrode 265 is shifted in the left or right direction (i.e., along the direction of the gate line 120) due to misalignment. When the drain electrode 250 is shifted toward the left direction, the capacitance of the parasitic capacitor C'gd 260 is increased due to the increase of the overlapping area between the drain electrode 250 and the gate electrode 130. In addition, the capacitance of the compensating parasitic capacitor C"gd 268 is decreased due to the decrease of the overlapping area between the compensating drain electrode 265 and the gate line 120. On the other hand, when the drain electrode 250 is shifted toward the right direction, the capacitance of the parasitic capacitor C'gd 260 is decreased due to the decrease of the overlapping area between the drain electrode 250 and the gate electrode 130, and the capacitance of the compensating parasitic capacitor C"gd 268 is increased due to the increase of the overlapping area between the compensating drain electrode 265 and the gate line 120. Therefore, the deviation of the total parasitic capacitor Cgd becomes insignificant and the total parasitic capacitor Cgd may be constantly maintained at a substantially constant value.

That is, the compensating drain electrode 265 improves the uniformity of the total parasitic capacitance Cgd between the drain and the gate. The uniformity of the total parasitic capacitance Cgd is improved by sufficiently securing a region where the compensating drain electrode 265 and the gate line 120 are overlapped.

The liquid crystal panel according to the illustrated embodiment secures a comparatively large region at the design margin region B for the compensating parasitic capacitor C"gd 268. Therefore, the liquid crystal panel has advantageous structure for maintaining the uniformity of the total parasitic capacitance Cgd.

Therefore the deviation of the total parasitic capacitor Cgd in each cell will be insignificant. In other words, a substantially uniform parasitic capacitance for each cell will be easily obtained, and the afterimages and the flickers are limited by reducing the variation of the kick-back voltage ΔVp.

The structure of the array board of the liquid crystal panel will be described in detail with reference to FIGS. 6A and 6B.

FIGS. 6A and 6B are cross-sectional views taken along lines II-II' and III-III' of FIG. 5. As shown in FIG. 6A, a gate electrode 130 and a gate line 120 are formed on a board 110, and a gate insulating layer 190 is formed on the resulting of forming the gate electrode 130 and the gate line 120 on the board 110.

Then, a semiconductor layer 210 is formed on the gate electrode 130 by sequentially forming an active layer 210a and an ohmic contact layer 210b on the gate electrode 130. After forming the semiconductor layer 210, a data line (not shown) is formed perpendicularly to the gate line 120. Then, a source electrode 230 is formed to be connected to the data line, and a drain electrode 250 is formed to be separated from the source electrode 230 at a predetermined distance. The source electrode 230 and the drain electrode 250 are formed on the semiconductor layer 210. Herein, a channel CH region is formed between an active layer 210a of the semiconductor layer 210 having a predetermined region exposed That is, a thin film transistor TFT 280 having the gate electrode 130, the source electrode 230 and the drain electrode 250 is formed with the semiconductor layer 210 interposed therebetween.

Herein, a parasitic capacitor C'gd 260 is provided at a region where the gate electrode 130 and the drain electrode 250 are overlapped with the gate insulating layer 190 interposed therebetween.

Although it is not shown in the accompanying drawings, the drain electrode 250 is formed to have at least two protrusions which are overlapped with the gate electrode 130 and a common line 150 respectively. A pixel region P is defined by the gate line 120 and the data line 220, and the TFT 280 is formed in the pixel region P.

In addition, a compensating drain electrode 265 is integrally formed with and connected to the drain electrode 250 to overlap with the gate line 120. A compensating parasitic capacitor C"gd 268 is provided at a region where the compensating drain electrode 265 and the gate line 120 are overlapped with the gate insulating layer 190 interposed therebetween.

The compensating drain electrode 265 is made of a material identical to the drain electrode 250 and is formed at a same layer of the drain electrode 250. That is, the compensating drain electrode 265 is formed at the same time when the drain electrode 250 is formed. It should be noted that the compensating drain electrode 265 can also be formed after or before the drain electrode 250 is formed.

The parasitic capacitor C'gd 260 and the compensating parasitic capacitor C"gd 268 are connected in parallel the gate electrode 130 is in contact with the gate line 120. Therefore, the total parasitic capacitance Cgd is the total capacitance of the parasitic capacitor C'gd 260 and the compensating capacitor C"gd 268.

As mentioned, the compensating drain electrode 265 in a design margin region B provides the compensating parasitic capacitor C"gd 268 to compensate the capacitance of the parasitic capacitor C'gd 260 when the combination of the drain electrode 250 and the compensating drain electrode 265 is shifted in the left or right direction (i.e., along the direction of the gate line 120) due to misalignment. Therefore, the deviation of the total parasitic capacitor Cgd becomes insignificant and the total parasitic capacitor Cgd may be constantly maintained at a substantially constant value. Therefore, a substantially uniform parasitic capacitor may be easily obtained for each cell, and the afterimages and the flickers are limited by reducing the variation of the kick-back voltage $\Delta Vp$.

As shown in FIG. 6B, a common line 150 and a common electrode 170 are formed on the board 110, and a gate insulating layer 190 is formed on the common line 150 and the common electrode 170 on the board 110.

The drain electrode 250 of FIG. 6A is formed on the common line 150 to overlap the common line 150. A storage capacitor Cst 270 is formed a region where the common line 150 and the drain electrode 250 are overlapped with the gate insulating layer 190 interposed therebetween.

A passivation layer 290 is further formed on the bard 110 having the drain electrode 250, and a contact hole 310 is formed by etching the passivation layer 290 to expose a predetermined region of the drain electrode 250. A pixel electrode 330 is formed in the pixel region P of the bottom board 110 to be electrically connected to the drain electrode 250 through the contact hole 310. Herein, the pixel electrode 330 is formed to be interlaced with the common electrode 170.

Figure 7A:
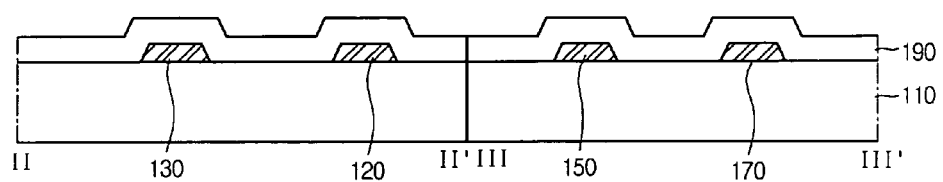
FIGS. 7A through 7C are cross-sectional views for illustrating a method of fabricating an In-plane switching liquid crystal panel according to an embodiment of the present invention.
Figure 7B:
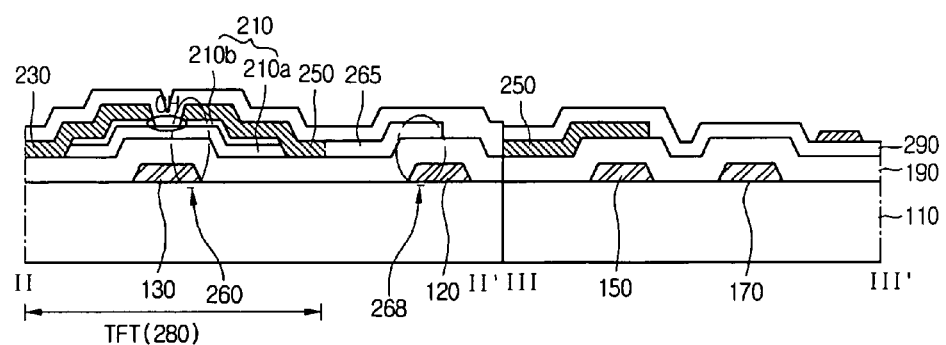
Figure 7C:
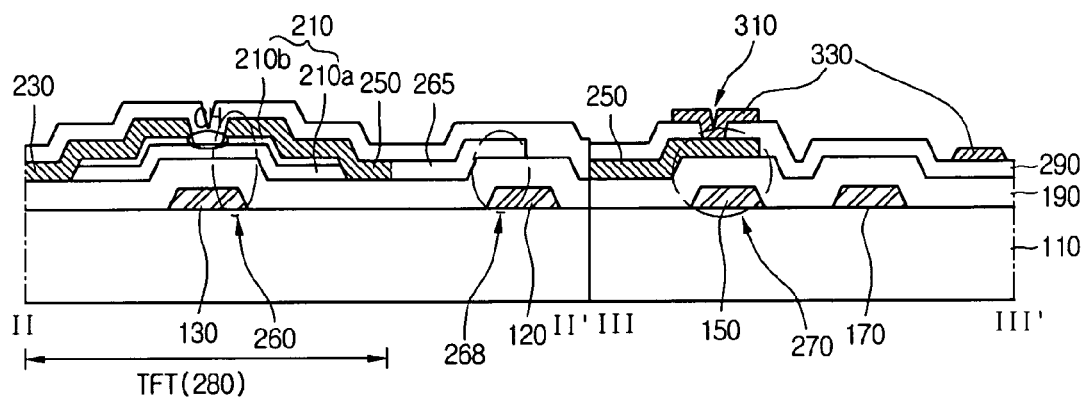

FIGS. 7A through 7C are cross-sectional views for illustrated a method of fabricating an In-plane switching mode liquid crystal panel according to an embodiment of the present invention. As shown in FIG. 7A, a gate electrode 130, a gate line 120, a common line 150 and a common electrode 170 are formed on a board 110 made of a transparent glass.

In order to form the gate electrode 130, the gate line 120, the common line 150 and the common electrode 170, a conductive metal is deposited on the entire surface of the board 110 through a deposition method such as a sputtering, and the conductive metal is patterned using a mask.

The conductive metal may be one selected from the group consisting of aluminum Al, aluminum alloy AlNd, tungsten W, chrome Cr, titanium Ti and molybdenum Mo.

Then, a gate insulating layer 190 is formed on the gate electrode 130, the gate line 120, the common line 150 and the common electrode 170. In order to form the gate insulating layer 190, a dielectric material is deposited on the entire surface of the board 110 having the gate electrode 130 and the gate line 120n through a deposition method such as plasma enhanced chemical vapor deposition (PECVD) or low pressure chemical vapor deposition (LPCVD). The dielectric material may be one selected from the group consisting of SiNx, SiOx or a dual-layer configured thereof.

As shown in FIG. 7B, a semiconductor layer 210 is formed on a predetermined region of the gate insulating layer where faces the gate electrode 130. In order to form the semiconductor layer 210, pure amorphous silicon or amorphous silicon having an N or a P type impurity is deposited through the PECVD or LPCVD, and the deposited silicon is patterned through a mask process to form an active layer 210a and an ohmic contact layer 210b in sequence.

After forming the semiconductor layer 210, a data line (not shown), a source electrode 230, a drain electrode 250 and a compensating drain electrode 265 are formed on the board 110 having the semiconductor layer 210.

In the illustrated embodiment, the data line, the source electrode 230, the drain electrode 250 and the compensating drain electrode 265 are made of a same material and formed on the same layer at the same time.

In order to form the source electrode 230, the drain electrode 250 and the compensating drain electrode 265, a conductive metal is deposited on the entire surface of the board 110 having the semiconductor layer 210 through a deposition method such as chemical vapor deposition (CVD) and a sputtering, and the deposited conductive metal is patterned using a mask.

The conductive metal is one selected from the group consisting of chrome Cr, molybdenum Mo, tungsten W, titanium Ti, aluminum Al and aluminum alloy AlNd.

Herein, the source electrode 230 and the drain electrode 250 are overlapped with a predetermined region of the ohmic contact layer 210b of the semiconductor layer 210, and a channel CH is formed by separating the source electrode 230 and the drain electrode 250 at a predetermined distance to expose a predetermined region of the active layer 210a.

That is, a conductive metal between the source electrode 230 and the drain electrode 250 is etched to form the channel. When etching, the ohmic contact layer 210b is etched to expose the predetermined region of the active layer 210a of the semiconductor layer 210.

The TFT 280 having the gate electrode 130, the semiconductor layer 210, the source electrode 230 and the drain electrode 250 is formed as described above.

Therefore, if a high level voltage is supplied to the gate electrode 130 and the data voltage is supplied to the source electrode 230, the data voltage supplied to the source electrode 230 is transmitted to the drain electrode 250 through the semiconductor 210 because the semiconductor 210 passes electricity by the high level voltage supplied to the gate electrode 130.

In addition, a parasitic capacitor C'gd 260 is provided at a region where the drain electrode 250 and the gate electrode 130 are overlapped with the gate insulating layer 190 interposed therebetween, and a compensating parasitic capacitor C"gd 268 is provided at a region where the compensating drain electrode 265 and the gate line 120 are overlapped with the gate insulating layer 190 interposed therebetween.

A storage capacitor Cst 270 is formed at a region where the drain electrode 250 and the common line 150 are overlapped with the gate insulating layer 190 interposed therebetween.

A passivation layer 290 is formed on the board 110 having the TFT 280. The passivation layer 290 is formed by depositing one selected from the group consisting of BensoCycloButent BCB, acrylic resin and polyamide compound material through CVD.

As shown in FIG. 7C, a contact hole 310 is formed on the passivation layer 290 on the boards by etching the passivation layer 290 above the drain electrode 250 through a dry etching or a wet etching. After forming the contact hole 310, a pixel electrode 330 is formed by depositing a transparent conductive material on the entire surface of the board 110 having the contact hole 310 through a vacuum deposition or a sputtering. Herein, the transparent conductive material may be one of ITO, IZO and ITZO.

The pixel electrode 330 is formed in a pixel region P that is defined by the data line and the gate line 120. Such a pixel electrode 330 is formed to be interlaced with the common electrode 170. By forming the pixel electrode 330, the array board of the liquid crystal panel is completely fabricated.

As described above, the compensating drain electrode 265 is to be integrally formed with and connected to the drain electrode 250, and the compensating parasitic capacitor C"gd 268 is provided between the compensating drain electrode 265 and the gate line 120. The compensating drain electrode 256 and the compensating parasitic capacitor C"gd 268 compensate the capacitance of the parasitic capacitor C'gd 260 when the drain electrode 290 is shifted in the right or left direction due to misalignment. Therefore, the deviation of the total parasitic capacitor Cgd in each cell is insignificant. Therefore, the uniformity of the parasitic capacitor between the drain and the gate is improved.

By improving the uniformity of the parasitic capacitor, the kick-back voltage is not significantly varied among the cells in the panel or frames. That is, the afterimages or the flickers are suppressed. As a result, the image quality of the liquid crystal panel is improved.

Although it is not shown in the accompanying drawings, the fabricated array board is joined with a color filter board having a color filter using a sealant excepting an injection hole. The liquid crystal panel is fabricated by injecting liquid crystal through the injection hole between the array board and the color filter board. The liquid crystal panel may further include an alignment layer to enhance the arrangement of the liquid crystal.

The liquid crystal layer is formed in an IPS mode which arranges a longitudinal axis of the liquid crystal molecule to be parallel to the plan surface of the alignment layer. Such an IPS mode liquid crystal panel displays an image by driving the liquid crystal through a lateral electric field.

For convenience, the IPS mode liquid crystal panel is illustrated as an embodiment of the present invention. However, the present invention is not limited thereby. The present invention may be applied to a vertical alignment mode (VA), a twisted nematic mode (TN mode) and a super twisted nematic mode (STN mode) liquid crystal panel.

The illustrated liquid crystal panel and the fabrication method thereof improve the uniformity of the parasitic capacitance even if misalignment occurs by providing the compensating drain electrode integrally formed with and connected to the drain electrode, thereby provides the compensating parasitic capacitor at the region where the gate line overlaps with the compensating drain electrode.

Therefore, the illustrated liquid crystal panel and the fabrication method thereof improve the image quality by suppressing the afterimage and the flickers by improving the uniformity of the parasitic capacitance between the drain and the gate.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal panel comprising:
    a gate line and a data line crossing each other to define a pixel;
    a thin film transistor including:
    a gate electrode connected to the gate line;
    a semiconductor layer formed on the gate electrode;
    a source electrode connected to the data line;
    a drain electrode;
    a gate insulating layer between the gate electrode and the drain electrode and between the gate line and the drain electrode;
    a compensating parasitic capacitor between the gate line and the drain electrode for compensating a parasitic capacitance between the gate electrode and the drain electrode; and
    a pixel electrode connected to the drain electrode,
    wherein the drain electrode has at least a first end and a second end, the first end of the drain electrode overlapping with the gate electrode, a parasitic capacitor with the parasitic capacitance being provided between the gate electrode and the first end of the drain electrode, the second end of the drain electrode overlapping with the gate line, the compensating parasitic capacitor being provided between the gate line and the second end of the drain electrode,
    wherein the drain electrode is formed parallel with the gate line,
    wherein a width of the gate line corresponding with a portion of the drain electrode between the first end and the second end of the drain electrode is narrower than that of the gate line overlapped by the second end of the drain electrode, and
    wherein the portion of the drain electrode is not overlapped with the gate line.

2. The liquid crystal panel of claim 1, wherein the gate insulating layer is located between the gate electrode and the first end of the drain electrode and between the gate line and the second end of the drain electrode to serve as an insulating layer of the parasitic capacitor and of the compensating parasitic capacitor.

3. The liquid crystal panel of claim 1, wherein the second end of the drain electrode is directly above the gate line.

4. The liquid crystal panel of claim 1, wherein the parasitic capacitor and the compensating parasitic capacitor are connected in parallel.

5. The liquid crystal panel of claim 1, wherein the drain electrode extends from the first end to the second end along a direction of the gate line.

6. The liquid crystal panel of claim 5, wherein the compensating parasitic capacitor compensates the parasitic capacitance when the drain electrode is shifted along the direction of the gate line.

7. The liquid crystal panel of claim 5, wherein a total capacitance of the parasitic capacitor and the compensating parasitic capacitor is substantially constant when the drain electrode is shifted along the direction of the gate line.

8. The liquid crystal panel of claim 1, wherein the drain electrode has a third end, the pixel electrode being connected to the third end of the drain electrode.

9. The liquid crystal panel of claim 8, wherein the third end of the drain electrode overlaps with a common line, the gate insulating layer being between the common line and the third end of the drain electrode, a combination of the third end of the drain electrode, the common line and the gate insulating layer being a storage capacitor of the pixel.

10. The liquid crystal panel of claim 9, wherein the source electrode and the drain electrode are formed to provide a U-shaped channel.

11. A method of fabricating a liquid crystal panel comprising:
    forming a gate line and a data line crossing each other to define a pixel;
    forming a thin film transistor including:
    forming a gate electrode connected to the gate line;
    forming a semiconductor layer on the gate electrode;
    forming a source electrode connected to the data line;
    forming a drain electrode to provide a compensating parasitic capacitor between the gate line and the drain electrode to compensate a parasitic capacitance between the gate electrode and the drain electrode;
    forming a gate insulating layer between the gate electrode and the drain electrode and between the gate line and the drain electrode; and
    forming a pixel electrode connected to the drain electrode,
    wherein the step of forming the drain electrode includes:
    forming a first end of the drain electrode to overlap with the gate electrode, thereby a parasitic capacitor with parasitic capacitance being provided between the gate electrode and the first end of the drain electrode; and
    forming a second end of the drain electrode to overlap with the gate line to provide the compensating parasitic capacitor between the gate line and the second end of the drain electrode,
    wherein the drain electrode is formed parallel with the gate line,
    wherein a width of the gate line corresponding with a portion of the drain electrode between the first end and the second end of the drain electrode is narrower than that of the gate line overlapped by the second end of the drain electrode, and
    wherein the portion of the drain electrode is not overlapped with the gate line.

12. The method of claim 11, wherein the step of forming the gate insulating layer includes forming the gate insulating layer between the gate electrode and the first end of the drain electrode and between the gate line and the second end of the drain electrode to serve as an insulating layer of the parasitic capacitor and of the compensating parasitic capacitor.

13. The method of claim 11, wherein the step of forming the second end of the drain electrode includes forming the second end of the drain electrode to be directly above the gate line.

14. The method of claim 11, wherein the parasitic capacitor and the compensating parasitic capacitor are connected in parallel.

15. The method of claim 11, wherein the step of forming the drain electrode includes forming the drain electrode to extend from the first end to the second end along a direction of the gate line.

16. The method of claim 15, wherein the compensating parasitic capacitor compensates the parasitic capacitance when the drain electrode is shifted along the direction of the gate line.

17. The method of claim 15, wherein a total capacitance of the parasitic capacitor and the compensating parasitic capacitor is substantially constant when the drain electrode is shifted along the direction of the gate line.

18. The method of claim 11, wherein the step of forming the drain electrode includes forming a third end of the drain electrode to be connected to the pixel electrode.

19. The method of claim 18, wherein the step of forming the third end of the drain electrode includes overlapping the third end of the drain electrode with a common line to generate a storage capacitor of the pixel between the third end of the drain electrode and the common line.

20. The method of claim 11, wherein the drain electrode is made of one selected from the group consisting of chrome Cr, molybdenum Mo, tungsten W, titanium Ti, aluminum Al and aluminum alloy AlNd.

21. The method of claim 11, wherein the drain electrode is formed by performing a chemical vapor deposition or a sputtering.

* * * * *